May 1, 1945.　　　R. R. COLBURN　　　2,374,732
METHOD OF PAVING
Filed Oct. 26, 1942　　　2 Sheets-Sheet 1
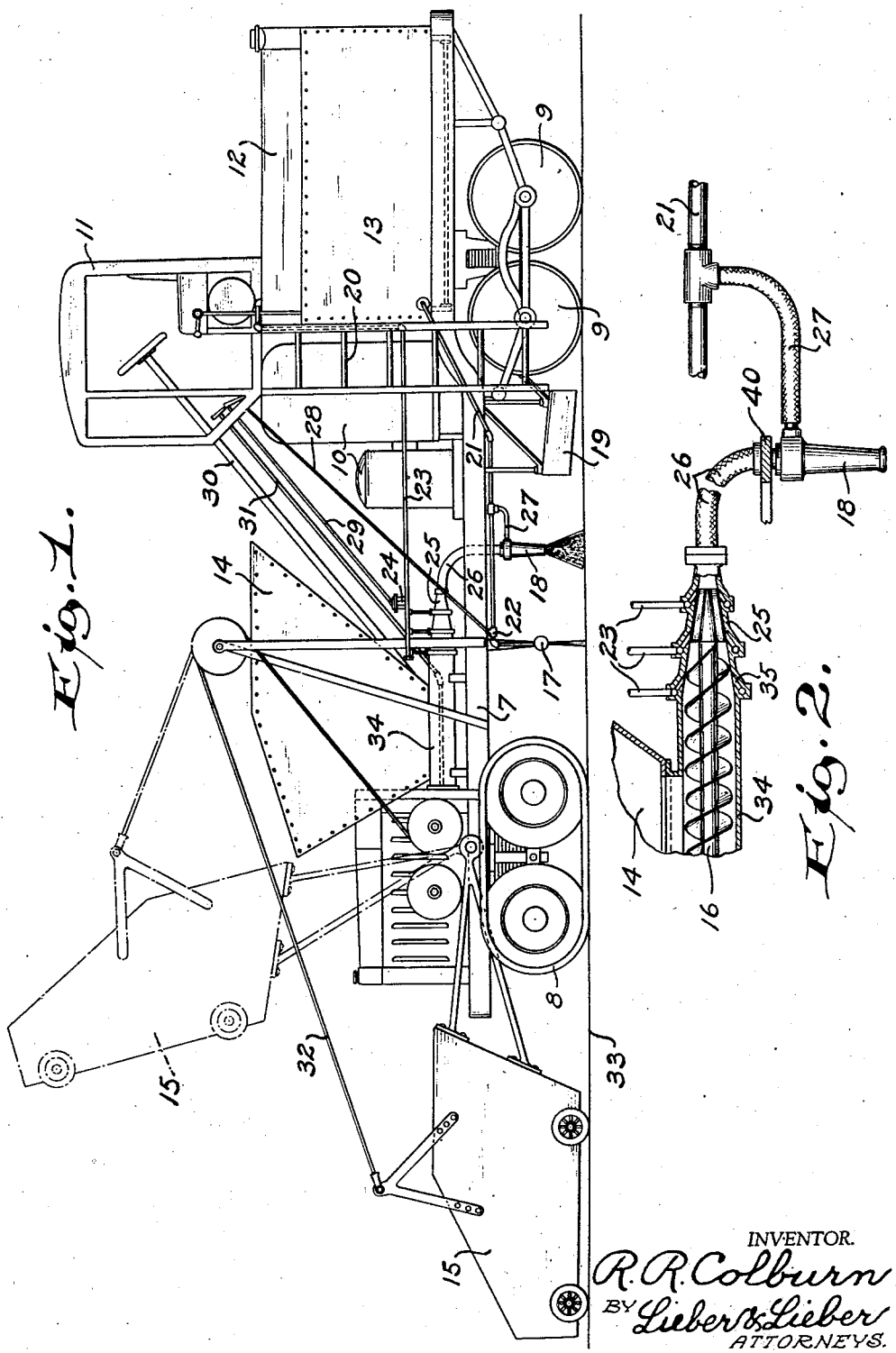
INVENTOR.
R. R. Colburn
BY Lieber & Lieber
ATTORNEYS.

May 1, 1945.  R. R. COLBURN  2,374,732
METHOD OF PAVING
Filed Oct. 26, 1942  2 Sheets-Sheet 2
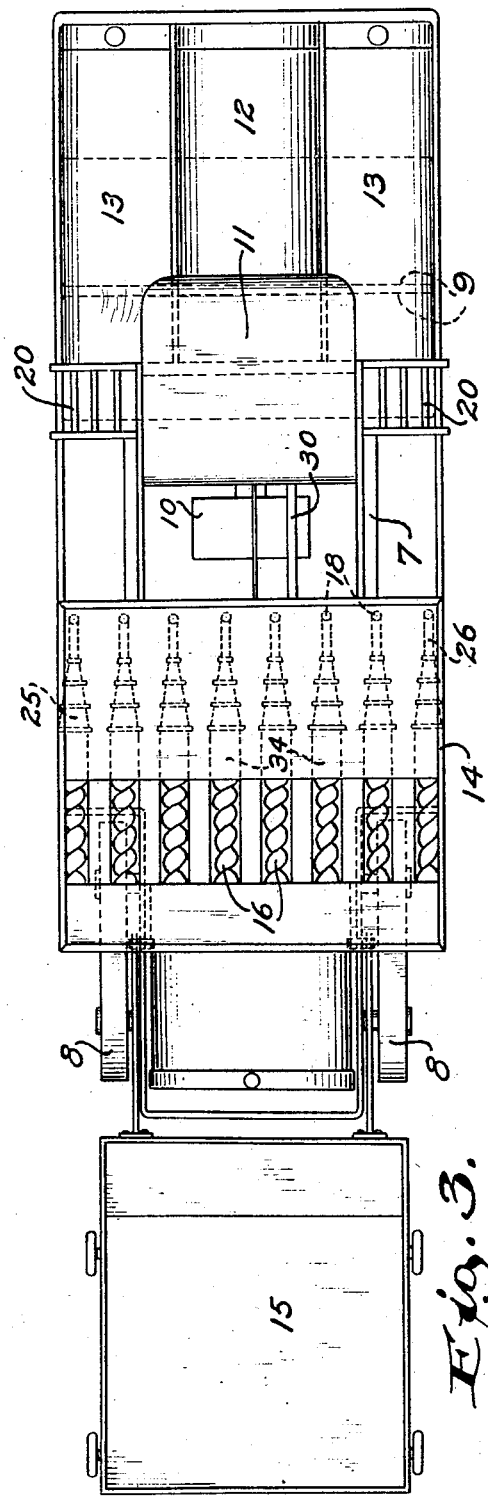
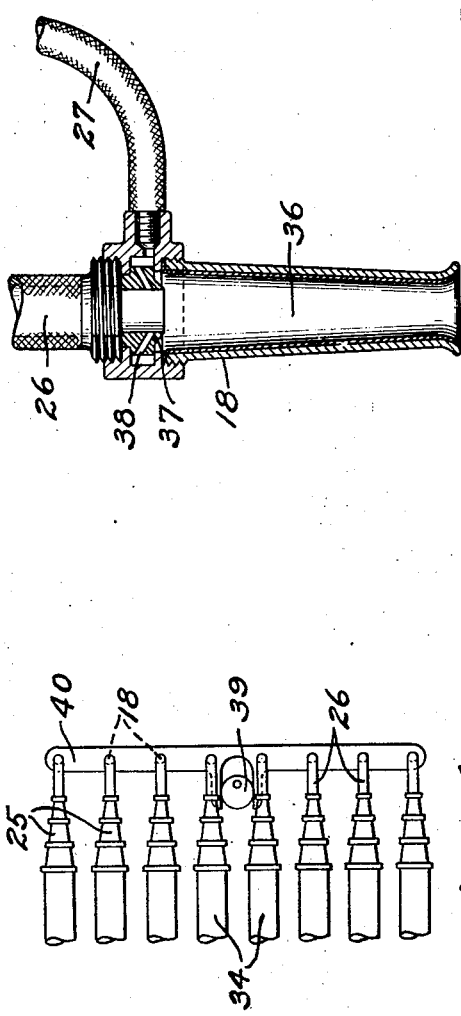
INVENTOR.
R. R. Colburn
BY Lieber & Lieber
ATTORNEYS.

Patented May 1, 1945

2,374,732

UNITED STATES PATENT OFFICE 2,374,732

METHOD OF PAVING

Richard R. Colburn, Waterloo, Iowa

Application October 26, 1942, Serial No. 463,324

1 Claim. (Cl. 94—23)

This invention relates generally to improvements in the art of paving, and relates more specifically to an improved method of applying composite paving materials of various kinds to roads, run-ways, or similar surfaces.

Generally defined, an object of my present invention is to provide a new and useful method of applying composite paving substances such as bituminous material to roadways or the like, together with simple, efficient and automatically functioning apparatus for facilitating continuous exploitation of the improved method.

It has long been common practice in the art of paving to repair and rejuvenate worn, cracked or otherwise damaged concrete roadways or the like, by applying thereto a coating of black topping or other surfacing material ordinarily consisting of dry mineral aggregate such as fine crushed stone mixed with a binder such as emulsified or oil asphalt. These surface layers were ordinarily applied in a relatively intermittent manner, in the form of successive batches of the mixture, which, after being dumped upon the roadway, were spread out into a relatively thin and approximately uniform layer and were thereafter tamped, rolled or otherwise leveled and finished. In some cases, rough spots and cracks in the roadway were first coated with asphalt or other binder so as to insure proper bonding of the surfacing material at these localities, but in all cases the various operations were either carried out primarily by hand with the aid of relatively crude and cumbersome equipment, or with the use of a number of independent machines, and the prior methods were all very tedious and quite costly. It was moreover difficult with these prior methods to rapidly produce a uniform mixture of the aggregate with the bonding material, thus resulting in final surfacing which was not homogeneous and of uniform texture.

The present invention therefore contemplates provision of an improved method of rapidly, continuously, and more effectively mixing and laying composite surfacing materials, and of bonding the mixture with the entire surfaces of the areas to which they are applied, and whereby the cost of the paving operation is reduced to a minimum.

Some of the more specific objects of this invention may be enumerated as follows:

To provide an improved method of first effectively and continuously applying a suitable bonding agent to all portions of the surface which is to be paved, and for thereafter rapidly and continuously depositing a uniform layer of the composite paving coating upon and intimately uniting it with the bonding material.

To provide an improved simple and highly efficient pavement applying process which can be carried on with minimum effort and by relatively unskilled laborers, and with which the surfacing material may be most effectively mixed and driven into intimate contact with the roadway.

To provide an improved system of mixing and of applying composite paving materials of various types, including black topping comprising a mixture of dry mineral aggregate and asphalt or other bituminous bonding substance, or gravel topping comprising a mixture of gravel and crude oil.

To provide various improvements in the art of surfacing extensive areas such as roadways or the like, with various paving materials, in an expeditious, economical and most effective manner.

These and other specific objects and advantages of my present invention will be apparent from the following detailed description.

A clear conception of the several steps of my improved paving method, and of the construction and operation of my automatic paving machine, may be had by referring to the drawings accompanying and forming a part of this specification wherein like reference characters designate the same or similar parts in the various views.

Fig. 1 is a somewhat diagrammatic side elevation of an improved continuous paving machine or unit adapted to carry on my improved paving method;

Fig. 2 is a longitudinal central section through one of the dry aggregate feeding devices and the asphalt injecting members for converting the aggregate into surfacing mixture;

Fig. 3 is a diagrammatic plane view of the apparatus shown in Fig. 1;

Fig. 4 is a rather diagrammatic view showing one type of mechanism for laterally moving or oscillating the delivery nozzles for the surfacing material; and Fig. 5 is a somewhat enlarged longitudinal section through one type of mixture delivery nozzle.

While the invention has been shown and described herein as being especially applicable to a paving machine and method for applying black topping to roadways in a continuous manner after initial application of a bonding agent to the roadway, it is not my desire or intent to thereby unnecessarily limit the scope or restrict the utility of the improvement which may obviously be more generally applied to other types of surfacing equipment.

In the accompanying drawings I have shown more or less diagrammatically, a typical mobile unit for carrying on my improved method with a single machine, and this machine comprises in general a power propelled vehicle having a chassis 7 supported at its front by means of motor driven endless track mechanisms 8, and at its rear by means of relatively heavy trailer rollers 9; while the portable chassis 7 provides a support for an engine driven generator set 10, a driver's control cab 11 located above the power set 10, compressed air and liquid asphalt storage tanks 12, 13 respectively disposed rearwardly of the cab 11, a dry mineral aggregate distributing hopper 14 in front of the cab 11 and adapted to be supplied with material by a power skip 15 and to deliver this material to a series of parallel screw feeders 16, a bond coating spray device 17 disposed rearwardly of the tracks 8, a series of paving material impacting nozzles 18 communicating with the screw feeders 16 and depending from the chassis 7 in back of the coating devices 17, and mechanisms for compressing air, for driving the endless tracks 8, and for operating the skip 15 all deriving power from the generator set 10.

The chassis 7 should preferably be of relatively sturdy construction, and while the mobile unit may be of approximately standard vehicle width at the power driven wheels or track mechanisms 8 and across the loading skip 15, the rear portion of the unit may be considerably wider as shown in Fig. 3, so that the material delivery devices 17, nozzles 18 and rollers 9 may be extended outwardly and laterally beyond the tread paths. The surface finishing rollers 9 are flexibly suspended from the rear of the chassis 7, and a vertically adjustable scraper 19 may be disposed beneath the chassis 7 in front of the press rollers 9, although such scraper may not be necessary. The power plant or generator set 10 should preferably be of sufficient capacity to produce sufficient power to drive all of the auxiliary equipment associated with the mobile unit, and the control cab 11 which is accessible by means of ladders 20 should be disposed sufficiently high so as to permit the operator to see the path of travel of the vehicle and the interior of the hopper 14.

The unit should be provided with a compressor of ample capacity to maintain the compressed air storage tank 12 properly supplied with compressed air at relatively high pressure, and the asphalt storage tanks 13 should also be of relatively large capacity and may be provided with heaters for maintaining the asphalt or other bonding agent in fluent condition. It is preferable to provide two of the asphalt tanks 13 so that one may be maintained under pressure while the other is being filled, and the bonding agent supply tanks are connected by piping 21 and past control valves 22 with the coating or priming device 17, and with the mixture producing and impacting nozzles 18. The priming device 17 may consist of an elongated transverse horizontal tube having a series of lower spray orifices therein for depositing a continuous relatively thin layer of neat asphalt or other bonding agent upon the roadway beneath the advancing mobile unit. The air pressure supply tank 12 is connected by means of an air line 23 having a control valve 24 therein, with the tapered delivery ends 25 of the several screw feeders 16, as shown in Fig. 2, and the final delivery or impacting nozzles 18 are connected to the smaller delivery ends of the Venturi tubes or feed screw delivery ends 25, by means of flexible conduits 26. The nozzles 18 are also conected to the asphalt supply lines or pipes 21 by means of flexible conduits 27, and the valves 22 are controllable from the cab 7 by means of control mechanism 28 while the air valves 24 are also similarly controllable with the aid of control mechanism 29. The vehicle should also be provided with steering mechanism 30 and with clutch control mechanism 31 operable from the cab 7, and the skip 15 should likewise be provided with suitable control devices.

The dry aggregate supply skip 15 is swingably suspended from the front of the chassis 7 as shown in Fig. 1, and is adapted to be moved from solid line horizontal position, to dot-and-dash line approximately upright position, and vice-versa, with the aid of power driven hoisting and lowering mechanism 32. This skip mechanism will thus permit successive batches of dry mineral aggregate such as rather fine crushed stone, to be either removed from the roadway 33 or other surface which is to be paved, or to be received from trucks travelling along the roadway, when the skip is down and the mobile unit is advancing, and will enable these batches of aggregate to be dumped into the hopper 14 so as to maintain a constant and ample supply of this dry material within the hopper. The parallel screw feeders 16 are simultaneously revolvable within fixed tubular casings 34 the front ends of all of which are in open communication with the bottom of the hopper 14 and the opposite ends of which connect with the larger ends of the Venturi tubes 25, and the screws of the feeders 16 preferably have increasing pitch proceeding toward the Venturi tubes, as illustrated in Fig. 2.

Each of the Venturi tubes 25 is provided with a series of forwardly directed compressed air injection ports 35 disposed so as to augment the velocity of the stream of dry aggregate delivered thereto from the hopper 14 by the corresponding feed screw 16, and the mixture of dry aggregate and compressed air travels at high velocity through the flexible tubes 26 and through the nozzles 18. Each of the impacting nozzles 18 may be constructed as shown in detail in Fig. 5, with a central downwardly tapered passage 36 and with a ring valve 37 having a series of asphalt injection ports 38 which are directed downwardly into the central passage. As the dry aggregate flows past this ring valve at high velocity, liquid bonding agent or asphalt is forced at considerable pressure into the passage 36 whereupon the ingredients are thoroughly mixed and the mixture is impacted against the roadway 33. In order to insure uniform deposition of the mixture of paving material throughout the entire area of the road surface, I provide means in the form of an eccentric 39 coacting with a transverse plate or bar 40, for simultaneously moving or oscillating all of the nozzles 18 laterally of the path of advancement of the vehicle, as shown in Fig. 4. The eccentric may be rotated in any suitable manner from the common power source, and the flexible tubes or conduits 26, 27 will permit free lateral movement of the nozzles 18 in order to cause the same to uniformly impact the paving material against the bond coated surface of the roadway 33.

During normal operation of the apparatus when carrying on the several steps of my improved paving method, the mobile unit may be constantly transported along the surface of the roadway 33 which is to be paved, by means of the power unit 10, and the various mechanisms may be controlled and operated in an obvious manner by an attendant seated in the cab 11. The dry aggregate receiving hopper 14 should be constantly supplied with an abundance of material with the aid of the skip 15, and compressed air from the tank 12 should be supplied to the ports 35 of the Venturi tubes 25, while fluent bonding agent such as asphalt should also be supplied to the coating device 17 and nozzles 18 from the asphalt supply tank or tanks 13. The feed screws 16 should be rotated within their confining tubes or casings 34, and the eccentric 39 should be operating so as to constantly oscillate the nozzles 18 across the path of travel of the vehicle.

With the mobile unit operating in this manner, the device 17 will be depositing a relatively thin coating of bonding material such as fluent asphalt, along and throughout the entire area of the path of travel of the vehicle rearwardly of the endless track mechanisms 8. The dry mineral aggregate which is deposited into the casings 34 from the supply hopper 14, will be urged by the screws 16 rearwardly and toward the pre-coated road bed at relatively high velocity. The velocity of the streams of this dry material as they pass through the Venturi tubes 25, is materially augmented by the injection of compressed air through the ports 35, and when the rapidly advancing streams are delivered through the tubes 26 into the impacting nozzles 18, liquid asphalt is mixed with the dry aggregate and the mixture is shot at high velocity against the pre-coated surface of the roadway 33. The eccentric 39 will insure uniform delivery of the paving material throughout the entire surface of the roadway 33, and since the bonding agent delivered from the device 17 is still in fluent or plastic condition, the final layer of paving mixture will be thoroughly bonded to the surface of the roadway. The scraper blade 19 may thereafter be utilized to remove local humps, and the heavy rollers 9 will finally produce a finished surface upon the layer of paving mixture and will produce a smooth and level surfacing job. It will thus be noted that the single mobile unit is adapted to carry out all steps of the improved paving process in orderly fashion, and that this machine is capable of most effectively and rapidly applying the surfacing material.

From the foregoing detailed description it will be apparent that my present invention provides an improved method of rapidly and effectively applying paving material to road beds or the like. The bonding material is first applied to the entire strip of pavement, and the layer of paving material is subsequently impacted into the thin layer of bonding material and is firmly united with the entire surface of the roadway. The dry aggregate which is constantly delivered from the supply hopper 14 to the feed screws 16, is thoroughly and effectively mixed with the bonding agent delivered to the nozzles 18 from the flexible tubes 27, thus providing simple and efficient means for producing the final mixture of paving material. The provision of the eccentric 39 and cross bar 40 cooperating with the flexible tubes 26, 27 also insures most efficient and uniform distribution of the paving material to the road bed, and the mobile unit requires minimum attention and can be readily operated by a novice to produce highly satisfactory results. The invention can obviously be utilized to apply various types of bonding agents and various kinds of paving materials to extensive surface areas such as road beds, play grounds, run-ways or the like, and can produce highly efficient results at minimum cost.

It should be understood that it is not desired to limit this invention to the exact steps of the method or to the precise details of construction and operation of the apparatus, herein shown and described, for various modifications within the scope of the claim may occur to persons skilled in the art.

I claim:

The method of paving, which comprises, continuously supplying and intimately mixing dry aggregate and compressed air while causing a stream of the mixture to travel at high velocity centrally toward a delivery orifice, injecting fluent bonding material under pressure from all sides laterally into the rapidly advancing stream of mixed air and aggregate just prior to release of the stream through said orifice to provide a stream of final mixture and simultaneously augmenting the velocity of the stream of final mixture while advancing toward the orifice, and immediately thereafter impacting a high velocity jet of said final paving mixture against the surface being paved.

RICHARD R. COLBURN.